Aug. 23, 1927.
O. DOMMER
1,640,313
DEVICE FOR INDICATING AND RECORDING THE SPECIFIC GRAVITY OF GASES
Filed Feb. 5, 1925
6 Sheets-Sheet 1
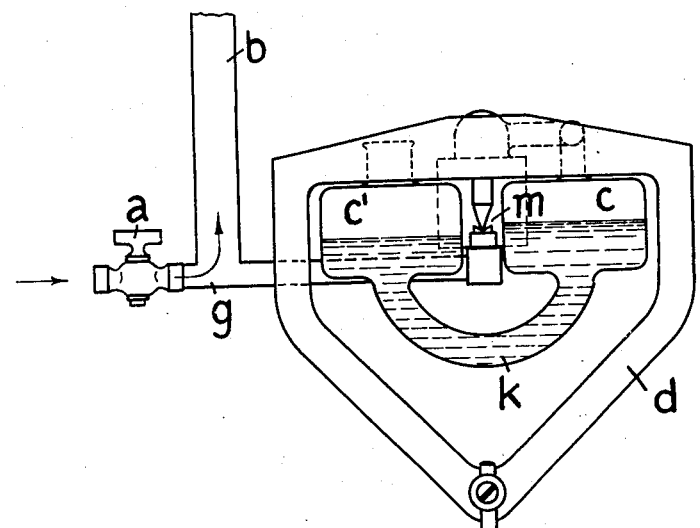
Fig. 1
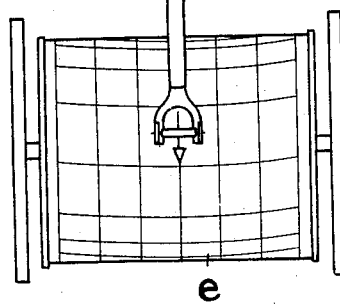
O. Dommer
inventor

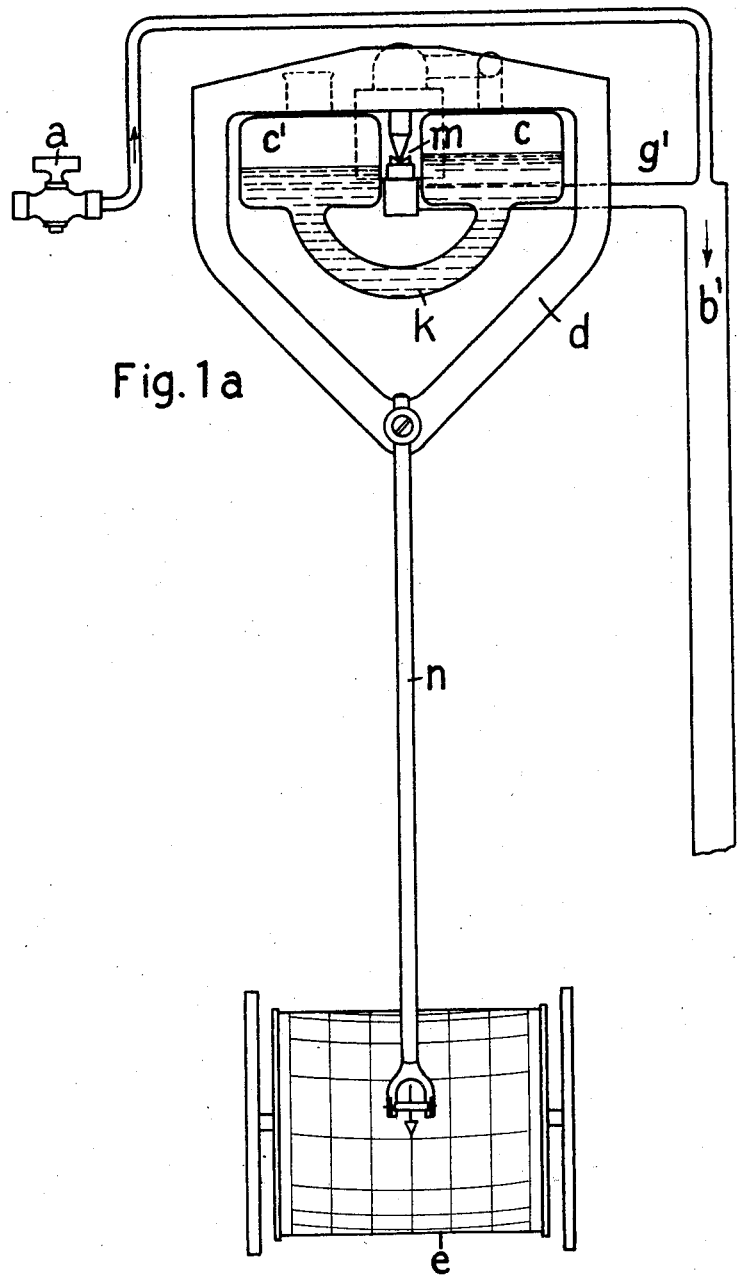

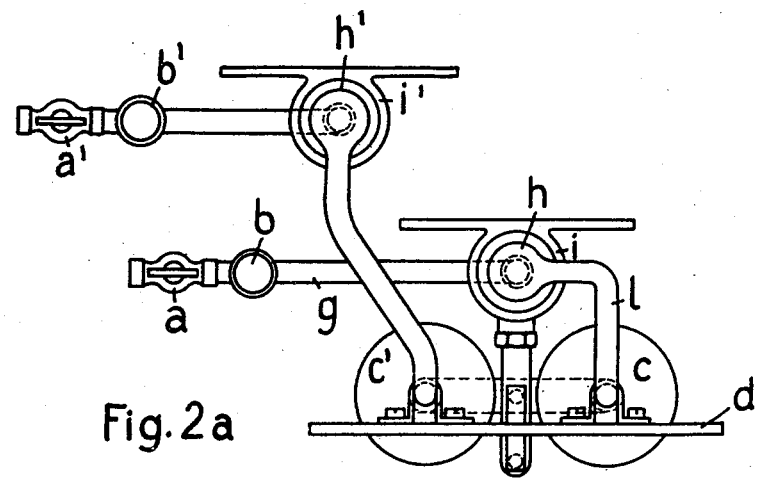

Aug. 23, 1927.

O. DOMMER 1,640,313

DEVICE FOR INDICATING AND RECORDING THE SPECIFIC GRAVITY OF GASES

Filed Feb. 5, 1925 6 Sheets-Sheet 4

Inventor:
Otto Dommer

Aug. 23, 1927.

O. DOMMER 1,640,313

DEVICE FOR INDICATING AND RECORDING THE SPECIFIC GRAVITY OF GASES

Filed Feb. 5, 1925   6 Sheets-Sheet 6

Inventor:
Otto Dommer
By Marks & Clerk
Attys

Patented Aug. 23, 1927.

1,640,313

UNITED STATES PATENT OFFICE.

OTTO DOMMER, OF KARLSRUHE, GERMANY.

DEVICE FOR INDICATING AND RECORDING THE SPECIFIC GRAVITY OF GASES.

Application filed February 5, 1925, Serial No. 7,186, and in Germany November 10, 1923.

This invention relates to devices for indicating and recording the specific gravity of gases, operating by action of a liquid piston, which is displaced by the weight of a gas resting thereupon. My invention consists essentially in providing a novel measuring and indicating arrangement for devices of the kind specified, the novelty of said arrangement consisting essentially therein, that the said liquid piston is pivotally mounted and that the weight of a perpendicularly arranged gas column acts upon one side of said liquid piston, while the other side of said liquid piston is actuated by the atmospheric pressure, or in some instances also by the weight of another gas which is intended to form the basis for the measurement. My invention furthermore has for its object, to devise an improved construction for the conduit by which the gas is supplied to the liquid piston. This improvement consists therein, that the said conduit is in communication with the atmosphere by a small opening, which will cause some air to be permanently drawn into said conduit.

It is a further object of my invention to so arrange the conduits and connections that accurate measurements and records may be obtained irrespective of the arrangement and particular form of the said conduits and irrespective of the gravity of the gases. Another object of the invention consists in the substantial elimination of the injurious influences of frictional resistances upon the indications. These and other important objects and advantages of my invention will appear from an inspection of the drawings, and as the specification proceeds.

Figure 3:
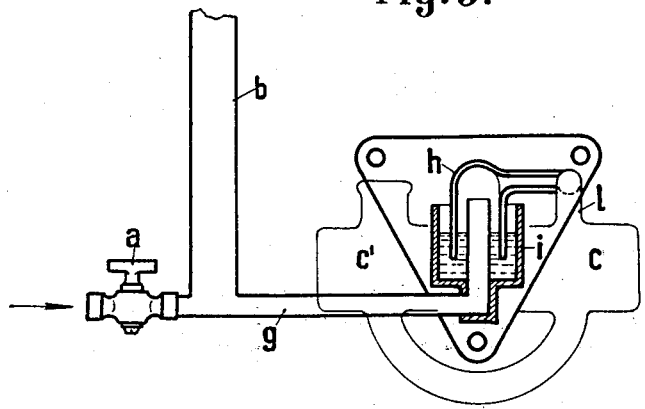
Figure 2:
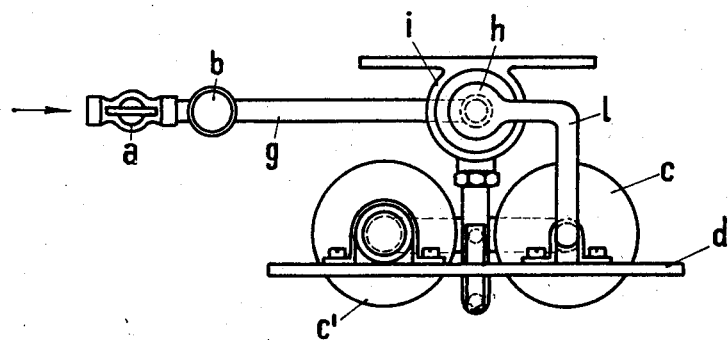
Figure 4:
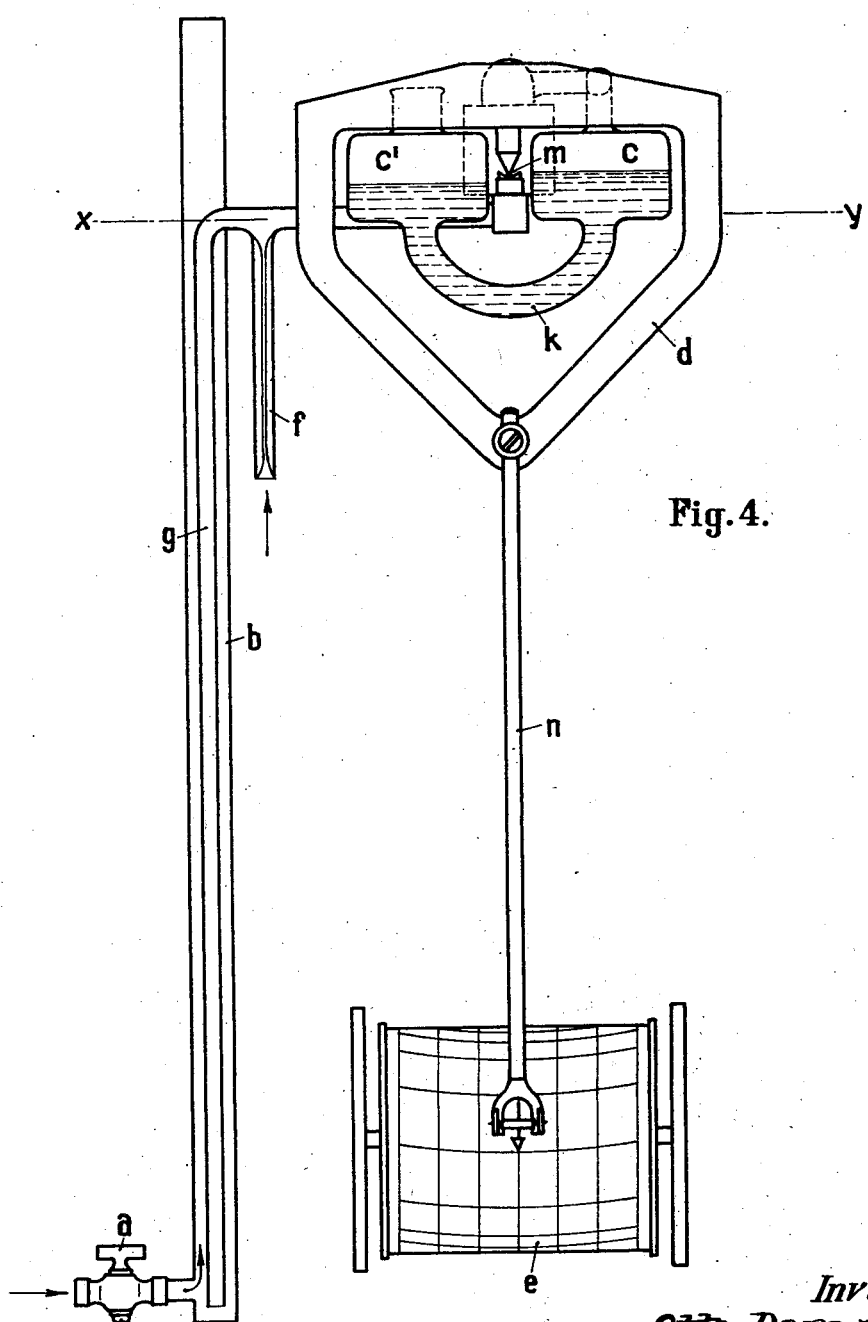
Figure 5:
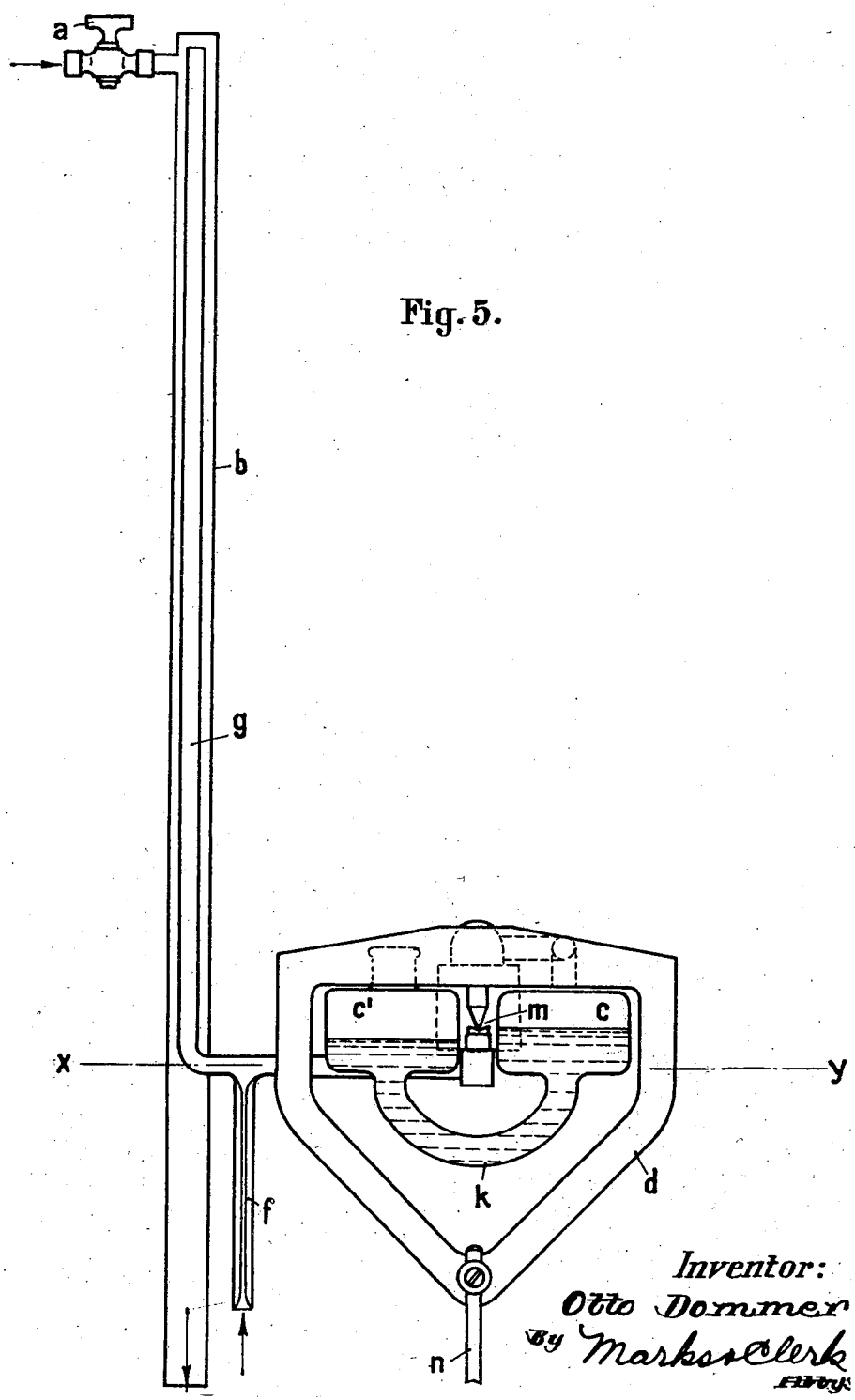

The invention will be more fully described with reference to the accompanying drawings showing by way of exemplification certain embodiments of the general principles of the invention in somewhat diagrammatic representations. Figure 1 is an elevation of the main parts of the apparatus. Fig. 1ª shows another modification of the device. Figure 2 is a plan view of Figure 1. Figure 2ª shows a modification in which instead of air another gas is used for measuring. Figure 3 is a fractional elevation, showing a preferred form of connection of the gas conduit with the supply of liquid by way of example. Figure 4 is an elevation of a somewhat modified construction of the apparatus, shown in Figure 1. In Figure 5 an elevation of another modification is shown in which the gas conduits are arranged different from Figure 1.

In the device according to Figure 1 the gas under observation or treatment enters through the throttling valve $a$ in the direction of the arrow. It ascends through the pipe $b$ which possesses a height corresponding to the value of the difference of specific gravities to be measured. The throttling by the valve $a$ and the diameter of the pipe $b$ are so adjusted that upon its passage through the pipe $b$ the gas cannot produce any measurable dynamic pressure. The static pressure at the base of the stand pipe $b$ is transmitted to the surface of the liquid in the container $c$ which is connected by the pipe conduit $k$ to the similar container $c'$ which latter is open to the atmosphere, so that the liquid in $c'$ is under atmospheric pressure. The difference of pressures in the container $c$ and $c'$ is accordingly equal to the difference of the static pressures on the base of a gas column of the height of the stand pipe $b$ relatively to the static pressure of a column of air of the same height. This difference of heights is proportional to the difference of the specific gravity of the gas under observation as compared with air, and this difference causes in the first place a displacement of the levels of the liquid in the containers $c, c'$. Inasmuch as these containers $c, c'$ are rigidly mounted on a frame $d$ which is freely rotatable or tiltable like a balance on its socket $m$ on which the frame rests in stabile equilibrium, the displacement of the liquid in the containers will cause a corresponding oscillation of such balance, and the angle of oscillation will be proportional to the difference of specific gravity of the gas with relation to air and is recorded upon a writing or recording drum or the like $e$ by means of the writing lever $n$ or the like which is rigidly connected to the balance structure $d$ described.

The connection between the container $c$ and the stand pipe $b$ should be effected in such a manner as to practically eliminate the influence of friction, and with this end in view use is made of the liquid seal, shown in Figures 2 and 3 of the drawing. This seal or liquid closure in its essential features comprises a cup $i$ into which the connecting tube $g$ with the stand pipe $b$ opens and enters from below, the said cup being filled with a sealing liquid for about half its height. To the top portion of the container $c$ a tube $l$ is connected the outer end of which has a bell-shaped extension $h$ which is immersed into the sealing liquid in the cup $i$, as shown in the drawing. By this means the transmission of the action of the static pressure to the containers $c$, $c'$ and to the recording instrument $n$ is effected substantially without pressure; but it should be understood that the invention is not limited to the means shown and described with reference to Figure 3, but that other means are contemplated within the scope of this invention for the substantially frictionless transmission of static pressure to the measuring and recording means.

In order to produce more powerful actions, especially in the case of gases the specific gravity of which differs only slightly from that of the air (smoke gas and the like), the pipe $b$ would have to be made very long. This may preferably be obviated, inasmuch as the apparatus should be advantageously suspended at a height corresponding to that of the eye of the observer, by also utilizing the space below the balance and by providing a second downwardly directed pipe $b'$. The action of the weight of the gas escaping through $b'$ is transmitted to the surface of the liquid in the container $c'$, whereby the torque exerted upon the balance will be increased. This modification is indicated in Figures 1ª and 2ª. In this case the container section $c'$ is not open at the top, but it will be connected in the same manner as the container section to the right, with a cup and adapted for the reception of the open end of the communicating tube $g'$ (Fig. 1ª). If the two pipes $b$ and $b'$ are of equal length the torque exerted upon the balance will be doubled. The action of the weight of the gas escaping through the pipe $b'$ acts upon the surface of the liquid in the container $c'$ and thereby intensifies the torque exerted upon the balance. This increase of torque is of great importance in case the differences of weight to be measured are very slight.

In the measuring device according to Figure 1 the measuring column $b$ should commence at the level of the surface of liquid, and the communicating conduit with $c$ should be maintained as horizontal as possible, because the gas slowly entering the conduit by diffusion will be liable to produce errors in the measurements. If, as an example, with communicating entrance conduits of greater length it becomes necessary to follow or avoid the top or camber of a door and gas enters by diffusion into said entrance conduit and, for instance, fills half of said conduit, the specific gravity is different in both legs of the arch, and the indications are absolutely wrong.

All these inconveniences are overcome by the means represented in Figure 4. By this means one is enabled to have the measuring pipe $b$ commence at any depth below the column or piston of liquid $c$, and this device admits of placing the measuring apparatus at any suitable distance from the indicating apparatus and allows of any desired manner of leading the conduit $g$ in the upward or downward direction, and by this means the entire communicating entrance conduit is permanently kept free from the gases to be investigated.

This object is accomplished by inserting throttling means in said entrance conduit, and preferably directly on the recording device the free passage of said throttling means being so adjusted that by the action of the upward pressure of the gas ascending the pipe $b$ a sufficient quantity of atmospheric air is aspirated through the tube $f$ so that the pipe $g$ is always filled with air, and the diffusion of the gas into said pipe $g$ is at least compensated. The quantity of air necessary for this purpose is so slight that substantially no errors of any practical account in the determination of the specific gravity (maximum errors 1%) can take place, and that no disturbing hydrodynamic pressure in the communicating entrance conduit occurs.

In the case of gases heavier than air it becomes necessary to turn the stand pipe $b$ around through 180 degrees on an assumed axis $x$—$y$, so as to cause the gases to flow from the top downwards (Figure 5). In the upper closed end portion of the pipe $b$ there will then exist an under-pressure corresponding to the difference of the specific gravity of the gas in relation to air, so that, on the other hand, air may be again aspirated into the pipe $g$ through the capillary tube $f$.

With all these devices it will be possible to measure gas relatively to air, and in addition to this, one gas with respect to any other gas. The latter may be accomplished by connecting one of the gases with one surface of the piston of liquid, and the other gas with the other surface. In the same manner this mode of measuring may be selected in all cases where it is desired to compare two gases exposed to the same underpressure.

It should be understood that the invention is not limited to the particular form, configuration, and arrangement and construction of parts of the apparatus herein shown and described by way of exemplification only, and that the principles thereof may be embodied in other constructions of apparatus, such exemplifications and modifications being within the scope of the claims hereunto appended.

I claim:—

1. A device for indicating the specific gravity of gases, comprising a container with communicating spaces, a liquid piston placed in said container and having normally liquid levels of even height in said spaces, means associated with each level and adapted to let a column of gas rest upon each of said liquid levels, a pivotal support for said container permitting a rotary motion thereof and indicating means adapted to indicate the displacement of the latter which is due to the weight of the columns of gases resting upon one of said liquid levels.

2. A device for indicating the specific gravity of gases, comprising a container with communicating spaces, a liquid piston placed in said container and having normally liquid levels of even height in said spaces, means associated with each level and adapted to let a column of gas rest upon each of said liquid levels, a pivotal support for said container permitting a rotary motion thereof and indicating means associated with said container and adapted to indicate the displacement of the latter which is due to the weight of the columns of gas resting upon said liquid levels.

3. A device for indicating the specific gravity of gases, comprising a container with communicating spaces, a liquid piston placed in said container and having normally liquid levels of even height in said spaces, a stand pipe associated with one of the spaces of said container and adapted to be filled with a column of the gas to be measured, whereby said column of gas will rest upon one of the said liquid levels, a second stand pipe adapted for the reception of a second column of the gas to be measured and arranged in communication with the other of the liquid levels, a pivotal support for said container permitting a rotary motion thereof, and indicating means associated with said container and adapted to indicate the displacement of the latter which is due to the weight of the column of gas resting upon one of said liquid levels.

4. A device for indicating the specific gravity of gases, comprising a container with communicating spaces, a liquid piston placed in said container and having normally liquid levels of even height in said spaces, means associated with each level and adapted to let a column of gas rest upon each of said liquid levels, a liquid seal interposed between one of said means and the space of the container which is in communication therewith and indicating means associated with said container and adapted to indicate the displacement of the latter which is due to the difference in weight of the column of gas resting upon the said liquid levels.

5. A device for indicating the specific gravity of gases, comprising a container with communicating spaces, a liquid piston placed in said container and having normally liquid levels of even height in said spaces, gas conducting means associated with each level and adapted to let a column of gas rest upon each of said liquid levels, a pivotal support for said container permitting a rotary motion thereof, having a supply conduit for supplying gas to the gas conducting means, and a small opening provided in said supply conduit for establishing a communication between the latter and the atmosphere, said communication permitting some air to be drawn into said supply conduit due to the lifting action of the gas to be measured, and indicating means associated with said container and adapted to indicate the displacement of the latter which is due to the weight of the column of gas resting upon one of said liquid levels.

OTTO DOMMER.